(12) United States Patent
Hollenbeck et al.

(10) Patent No.: US 11,128,034 B2
(45) Date of Patent: Sep. 21, 2021

(54) MASS CUSTOMIZATION OF ANTENNA ASSEMBLIES USING METAL ADDITIVE MANUFACTURING

(71) Applicant: Optisys, LLC, West Jordan, UT (US)

(72) Inventors: Michael Hollenbeck, West Jordan, UT (US); Robert Smith, West Jordan, UT (US)

(73) Assignee: Optisys, LLC, West Jordan, UT (US)

( * ) Notice: Subject to any disclaimer, the term of this patent is extended or adjusted under 35 U.S.C. 154(b) by 221 days.

(21) Appl. No.: 16/290,787

(22) Filed: Mar. 1, 2019

(65) Prior Publication Data

US 2020/0076066 A1 Mar. 5, 2020

Related U.S. Application Data

(60) Provisional application No. 62/637,948, filed on Mar. 2, 2018.

(51) Int. Cl.
*B29C 64/386* (2017.01)
*H01Q 1/38* (2006.01)
*G05B 15/02* (2006.01)
*H01P 11/00* (2006.01)

(52) U.S. Cl.
CPC ............ *H01Q 1/38* (2013.01); *B29C 64/386* (2017.08); *G05B 15/02* (2013.01); *H01P 11/002* (2013.01)

(58) Field of Classification Search
CPC .. H01Q 1/38; H01Q 13/0291; H01Q 13/0241; H01Q 13/0275; B29C 64/386; G05B 15/02; H01P 11/002; Y02P 10/25; B33Y 10/00; B33Y 50/02; B22F 2003/1057; B22F 2003/1055
See application file for complete search history.

(56) References Cited

U.S. PATENT DOCUMENTS

| | | | |
|---|---|---|---|
| 6,018,315 A | 1/2000 | Ince et al. | |
| 6,198,730 B1 | 3/2001 | Hogberg et al. | |
| 6,839,029 B2 * | 1/2005 | Mendolia | H01Q 1/38 29/600 |
| 9,253,925 B1 | 2/2016 | Smith | |
| 9,960,495 B1 | 5/2018 | Hollenbeck et al. | |
| 10,170,833 B1 | 1/2019 | Hollenbeck et al. | |
| 10,468,773 B2 | 11/2019 | Hollenbeck et al. | |
| 10,481,253 B1 | 11/2019 | Hollenbeck et al. | |
| 10,680,341 B1 | 6/2020 | Anderson et al. | |
| 2014/0347144 A1 * | 11/2014 | Nath | H01P 1/207 333/100 |

(Continued)

FOREIGN PATENT DOCUMENTS

FR 3087954 A1 10/2018
WO 2017203568 A1 11/2017

*Primary Examiner* — Awat M Salih
(74) *Attorney, Agent, or Firm* — Terrence J. Edwards; TechLaw Ventures, PLLC

(57) ABSTRACT

A method, system, and device provides components of an antenna assembly. Digital information representative of one or more characteristics of an antenna element of antenna assembly may be received by a processor. The processor may further receive a specification for the antenna element. The processor may adjust digital information representative of the antenna element to adjust the physical parameters of the component to meet the specification. The antenna assembly may be fabricated with the adjusted physical parameters.

21 Claims, 9 Drawing Sheets

(56) References Cited

U.S. PATENT DOCUMENTS

2015/0001762 A1   1/2015   Lacaze et al.
2020/0127358 A1   4/2020   de Rijk et al.
2020/0161738 A1   5/2020   de Rijk et al.

* cited by examiner

MASS CUSTOMIZATION OF ANTENNA ASSEMBLIES USING METAL ADDITIVE MANUFACTURING

CROSS-REFERENCE TO RELATED APPLICATIONS

This application claims the benefit under 35 U.S.C. § 119(e) of U.S. Provisional Patent Application No. 62/637,948 filed Mar. 2, 2018 and titled "MASS CUSTOMIZATION OF ANTENNA ASSEMBLIES USING METAL ADDITIVE MANUFACTURING," which is incorporated herein by reference in its entirety, including but not limited to those portions that specifically appear hereinafter, the incorporation by reference being made with the following exception: In the event that any portion of the above-referenced application is inconsistent with this application, this application supersedes said above-referenced application.

TECHNICAL FIELD

The disclosure relates generally to systems, methods, and devices related to an antenna and its construction. An antenna assembly may be implemented using specific antenna elements assembled or formed together with one or more physical parameters to provide one or more characteristics or electrical characteristics.

BACKGROUND

Antennas are ubiquitous in modern society and are becoming an increasingly important technology as smart devices multiply and wireless connectivity moves into exponentially more devices and platforms. An antenna structure designed for transmitting and receiving signals wirelessly between two points can be as simple as tuning a length of a wire to a known wavelength of a desired signal frequency. At a particular wavelength (which is inversely proportional to the frequency by the speed of light $\lambda=c/f$) for a particular length of wire, the wire will resonate in response to being exposed to the transmitted signal in a predictable manner that makes it possible to "read" or reconstruct a received signal. For simple devices, like radio and television, a wire antenna serves well enough.

Passive antenna structures are used in a variety of different applications. Communications is the most well-known application, and applies to areas such as radios, televisions, and internet. Radar is another common application for antennas, where the antenna, which can have a nearly equivalent passive radiating structure to a communications antenna, is used for sensing and detection. Common industries where radar antennas are employed include weather sensing, airport traffic control, naval vessel detection, and low earth orbit imaging. A wide variety of high performance applications exist for antennas that are less known outside the industry, such as electronic warfare and ISR (information, surveillance, and reconnaissance) to name a couple.

High performance antennas are required when high data rate, long range, or high signal to noise ratios are required for a particular application. In order to improve the performance of an antenna to meet a set of system requirements, for example on a satellite communications (SATCOM) antenna, it is desirable to reduce the sources of loss and increase the amount of energy that is directed in a specific area away from the antenna (referred to as 'gain'). In the most challenging applications, high performance must be accomplished while also surviving demanding environmental, shock, and vibration requirements. Losses in an antenna structure can be due to a variety of sources: material properties (losses in dielectrics, conductivity in metals), total path length a signal must travel in the passive structure (total loss is loss per length multiplied by the total length), multi-piece fabrication, antenna geometry, and others. These are all related to specific design and fabrication choices that an antenna designer must make when balancing size, weight, power, and cost performance metrics (SWaP-C). Gain of an antenna structure is a function of the area of the antenna and the frequency of operation. The only way to create a high gain antenna is to increase the total area with respect to the number of wavelengths, and poor choice of materials or fabrication method can rapidly reduce the achieved gain of the antenna by increasing the losses in the passive feed and radiating portions.

One of the lowest loss and highest performance RF structures is hollow metal waveguide. This is a structure that has a cross section of dielectric, air, or vacuum which is enclosed on the edges of the cross section by a conductive material, typically a metal like copper or aluminum. Typical cross sections for hollow metal waveguide include rectangles, squares, and circles, which have been selected due to the ease of analysis and fabrication in the $19^{th}$ and $20^{th}$ centuries. Air-filled hollow metal waveguide antennas and RF structures are used in the most demanding applications, such as reflector antenna feeds and antenna arrays. Reflector feeds and antenna arrays have the benefit of providing a very large antenna with respect to wavelength, and thus a high gain performance with low losses.

Traditional fabrication methods for array antennas using hollow metal waveguide have either been limited in size or cost, due to the complexity of fabricating all of the intricate features necessary for high performance in the small footprint required by physics. Further complicating the fabrication are system requirements for thermal dissipation for higher power handling, high strength to survive the shock and vibration of launch, addition of mechanical mounting interfaces, and close proximity to additional electronics boxes containing circuit card assemblies (CCAs) that perform various required active functions for the antenna (such as tracking, data, command, and control).

Every physical component is designed with the limitations of the fabrication method used to create the component. Antennas and RF components are particularly sensitive to fabrication method, as the majority of the critical features are inside the part, and very small changes in the geometry can lead to significant changes in antenna performance. Due to the limitations of traditional fabrication processes, hollow metal waveguide antennas and RF components have been designed so that they can be assembled as multi-piece assemblies, with a variety of flanges, interfaces, and seams. All of these joints where the structure is assembled together in a multi-piece fashion increase the size, weight, and part count of a final assembly while at the same time reducing performance through increased losses, path length, and reflections. This overall trend of increased size, weight, and part count with increased complexity of the structure have kept hollow metal waveguide arrays in the realm of applications where size, weight, and cost are less important than overall performance.

One challenge in antenna design is that different physical embodiments of antenna components or subcomponents is necessary when even minor changes in specifications are implemented. For example, if the intended frequency operation band changes, an antenna must be wholly redesigned physically and electrically to operate in a different band. In other words, the physical size of the antenna dictates how it will operate. Accordingly, minor changes in specifications for any reason will affect a design of an antenna requiring, in most cases, a complete redesign of the antenna. Since any new antenna design requires 9 months to a year in non-trivial applications, it is frequently the case that minor changes can result in significant delays in producing a final product.

It is therefore one object of this disclosure to provide antenna customization systems, methods, and devices that provide scalable antenna components for use in an antenna array to meet particular antenna specifications. It is a further object of this disclosure to provide scalable antenna components for use in an antenna assembly using additive manufacturing techniques. It is a further object of this disclosure to provide scalable antenna components as a unitary article of manufacture. It is a further object of this disclosure that provides access to digital representations of the scalable antenna components and sub-components which can be manipulated based on provided specifications and fabricated using additive manufacturing techniques.

SUMMARY

Discussed herein is method, system, and device for mass customization of an antenna assembly. In one embodiment, a method includes digital information representative of one or more characteristics of an antenna element of antenna assembly being received by a processor. The processor may further receive a specification for the antenna element. The processor may adjust digital information representative of the antenna element to adjust the physical parameters of the component to meet the specification. The antenna assembly may be fabricated with the adjusted physical parameters.

In another embodiment, a system may include a database which stores digital information representative of one or more characteristics of an antenna element of an antenna assembly. The system may further include a processor that receives the digital information representative of the one or more characteristics of the antenna element of the antenna assembly, receives a specification for the antenna element of the antenna assembly, and adjusts the digital information representative of the antenna element to adjust physical parameters of the antenna element. The system may further include an additive manufacturing device which fabricates the antenna element with the adjusted physical parameters.

In another embodiment, a device is provided. The device includes a memory device including digital information representative of one or more characteristics of an antenna element of an antenna assembly. The device further includes a processor which receives a specification for the antenna element, adjusts the digital information representative of the antenna element to adjust physical parameters of the antenna element and transmits the adjusted digital information for fabrication of the antenna element.

BRIEF DESCRIPTION OF THE DRAWINGS

Non-limiting and non-exhaustive implementations of the present disclosure are described with reference to the following figures, wherein like reference numerals refer to like parts throughout the various views unless otherwise specified. Advantages of the present disclosure will become better understood with regard to the following description and accompanying drawings where.

DETAILED DESCRIPTION

Figure 1A:
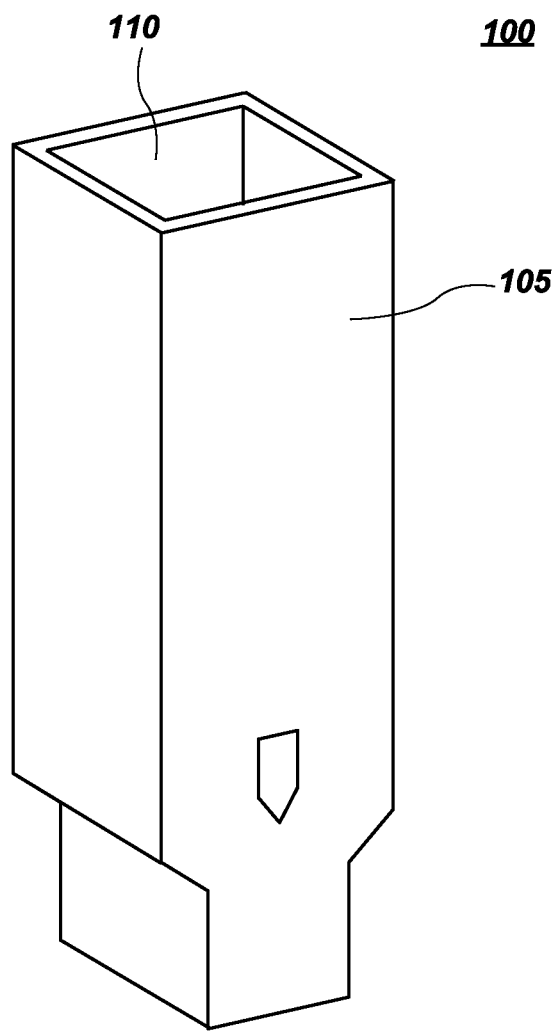
FIG. 1A illustrates a perspective view of a radiating element.

In the following description, for purposes of explanation and not limitation, specific techniques and embodiments are set forth, such as particular techniques and configurations, in order to provide a thorough understanding of the device disclosed herein. While the techniques and embodiments will primarily be described in context with the accompanying drawings, those skilled in the art will further appreciate that the techniques and embodiments may also be practiced in other similar devices.

Reference will now be made in detail to the exemplary embodiments, examples of which are illustrated in the accompanying drawings. Wherever possible, the same reference numbers are used throughout the drawings to refer to the same or like parts. It is further noted that elements disclosed with respect to particular embodiments are not restricted to only those embodiments in which they are described. For example, an element described in reference to one embodiment or figure, may be alternatively included in another embodiment or figure regardless of whether or not those elements are shown or described in another embodiment or figure. In other words, elements in the figures may be interchangeable between various embodiments disclosed herein, whether shown or not.

Before the structure, systems, and methods for integrated marketing are disclosed and described, it is to be understood that this disclosure is not limited to the particular structures, configurations, process steps, and materials disclosed herein as such structures, configurations, process steps, and materials may vary somewhat. It is also to be understood that the terminology employed herein is used for the purpose of describing particular embodiments only and is not intended to be limiting since the scope of the disclosure will be limited only by the appended claims and equivalents thereof.

In describing and claiming the subject matter of the disclosure, the following terminology will be used in accordance with the definitions set out below.

It must be noted that, as used in this specification and the appended claims, the singular forms "a," "an," and "the" include plural referents unless the context clearly dictates otherwise.

As used herein, the terms "comprising," "including," "containing," "characterized by," and grammatical equivalents thereof are inclusive or open-ended terms that do not exclude additional, unrecited elements or method steps.

As used herein, the phrase "consisting of" and grammatical equivalents thereof exclude any element or step not specified in the claim.

As used herein, the phrase "consisting essentially of" and grammatical equivalents thereof limit the scope of a claim to the specified materials or steps and those that do not materially affect the basic and novel characteristic or characteristics of the claimed disclosure.

It is also noted that many of the figures discussed herein show air volumes of various implementations of integrated portions of an antenna assembly. In other words, these air volumes illustrate negative spaces of the components within an antenna assembly which are created by a metal skin within the antenna assembly, as appropriate to implement the functionality described. It is to be understood that positive structures that create the negative space shown by the various air volumes are disclosed by the air volumes, the positive structures including a metal skin and being formed using the additive manufacturing techniques disclosed herein.

Referring now to the figures, FIG. 1A illustrates a perspective view of a radiating element 100. Radiating element 100 includes a body 105 which may be enveloped on all sides to create a void 110 within body 105 by a metal or metal composite. In one embodiment, body 105 may be a three dimensionally printed element that utilizes metallic substrate or that utilizes another substrate that bonds with metals as defined by the periodic table of elements (or other electrically conductive compositions), especially those metals which are known to have a high conductivity coefficient (e.g., copper, aluminum, gold etc.). In one embodiment, body 105, and other elements that will be described below, may be fabricated using a metal or metal alloy in an additive manufacturing process to produce a metal three dimensionally printed structure such that a minimum amount of metal is used to allow for the electrical, thermal, and mechanical requirements of the array which include receiving transmitted electromagnetic signals in the RF, microwave, and other signal bands.

Radiating element 100 may be built to a set of specifications. For example, radiating element 100 may be constructed in a manner to operate at a particular frequency range with a particular bandwidth, a particular gain and beam width, a particular polarization, a particular sidelobe level, a particular mask, having particular return losses, with or without a connector interface, at a particular operating temperature, a particular maximum power handling, a particular shock resiliency, a particular vibration resiliency, with or without particular mechanical interfaces, and with a particular maximum dimension. Any antenna design may require one or more of these specifications to identify the electrical or physical characteristics of radiating element 100, or any other element or sub-element of an antenna assembly. Mathematical relationships exist that relate the required specifications to physical parameters of radiating element 100, or any other element or sub-element of an antenna assembly. For example, void 110 may be smaller to accommodate a higher frequency range of operation than a larger void 110 in radiating element 100. At a higher power level, radiating element 100 may require additional metal material to account for increased heat generated during operation. Fundamentally, a relative physical size of an element or sub-element of an array, such as radiating element 100, may be dictated by provided specifications.

Figure 1B:
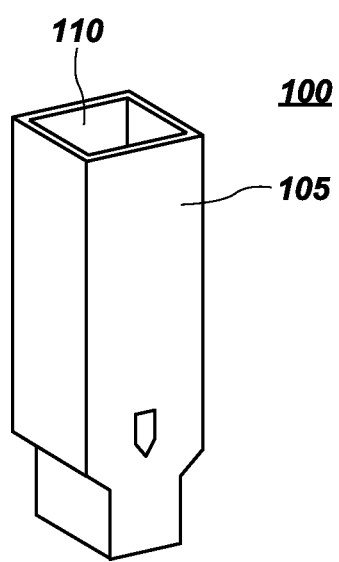
FIG. 1B illustrates a perspective view of another embodiment of the radiating element shown in FIG. 1A.

FIG. 1B illustrates a perspective view of another embodiment of radiating element 100, also shown in FIG. 1A. However, as shown in FIG. 1B, radiating element 110 has been scaled to have smaller physical dimensions, to meet a different specification requirement. For example, radiating element 100 shown in FIG. 1B may have a specification that dictates operation at a higher frequency band. A frequency range and bandwidth may be defined operate over a range of frequencies (e.g., 50 GHz to 100 GHz) and, as previously discussed, determines the size of all components, or sub-components of an RF array. These components and sub-components may be referred to as "RF units," or "antenna elements" in some cases. All RF units in an antenna assembly must be resized based on the specific frequency range. For example, a wavelength may be determined by a mathematical relationship which states that a wavelength is equal to the speed of light divided by frequency. Given a particular frequency specification, a wavelength may be simply calculated. Radiating element 100 shown in FIG. 1A may be referred to as a library RF unit having particular specifications, including a center frequency of an operable frequency band, associated with it. Next, radiating element 100 shown in FIG. 1B may also have a specification that sets a center frequency of the required operable frequency band. Radiating element 100 shown in FIG. 1B may be scaled by a scaling factor by simply dividing the wavelength of radiating element 100 shown in FIG. 1B by the wavelength of radiating element 100 shown in FIG. 1A. The scaling factor may be used to dictate a proportionate scaling in physical size of radiating element 100 shown in FIG. 1B relative to radiating element 100 shown in FIG. 1A.

It should be noted that scaling relative to this disclosure may be related to a plurality of RF units, components and sub-components of an antenna assembly and not solely to radiating element 100. As will be further discussed below, digital representations of a plurality of RF units may be stored in a database, or other memory device and which include a set of characteristics representative of base specifications for the RF units, and may be automatically adjusted and fabricated based on specifications provided by a user.

Figure 2:
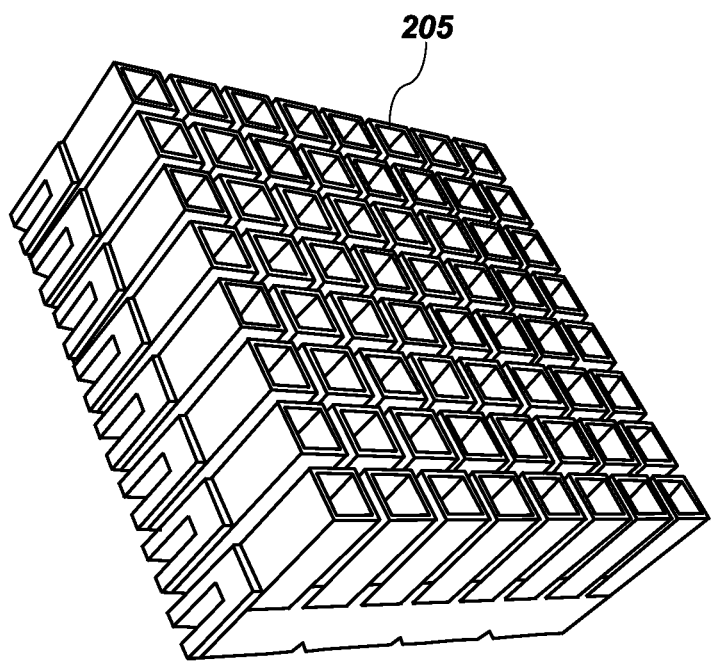
FIG. 2 illustrates an array of radiating elements.

FIG. 2 illustrates an array 200 of a plurality of radiating elements 205. Radiating elements 205 may be similar in implementation and description to radiating elements 100, shown and discussed above with respect to FIG. 1A and FIG. 1B. As shown, array 200 includes 64 individual radiating elements 205. For exemplary purposes, array 200 is shown to explain the scalability of one or more RF units/antenna elements, for to meet gain or beamwidth specifications. Fundamental physics laws mathematically link gain to beamwidth. Generally, gain may be described as amplification or power emission level in a directive fashion while beamwidth may be described as the rolloff or shape of the amplification or power emission from the peak level. For purposes here, gain is defined as a peak gain of an antenna pattern. Gain scaling (and corresponding beamwidth scaling) may be determined according to the following equation:

$$G_{tot} = G_{unit} + 10*\log_{10}(\#unit) - Loss \text{ where:}$$

$G_{tot}$ is the total gain required by the specification; $G_{unit}$ is the gain of each unit radiating element; #unit is the total number of units required to achieve $G_{tot}$, and Loss is the total of the insertion loss that is lost to ohmic and absorptive losses in the material.

Accordingly, once a gain specification is identified, a number of radiating elements, in this example, may be identified to achieve the gain specification for a particular frequency band, as discussed above. In other words, array 200 has been scaled to a particularly specified frequency band of operation at particularly specified gain level. Moreover, any RF unit or antenna element may be scaled accordingly to electrically match scaling that is applied to any of the other RF unit or antenna elements in an antenna assembly.

Figure 3:
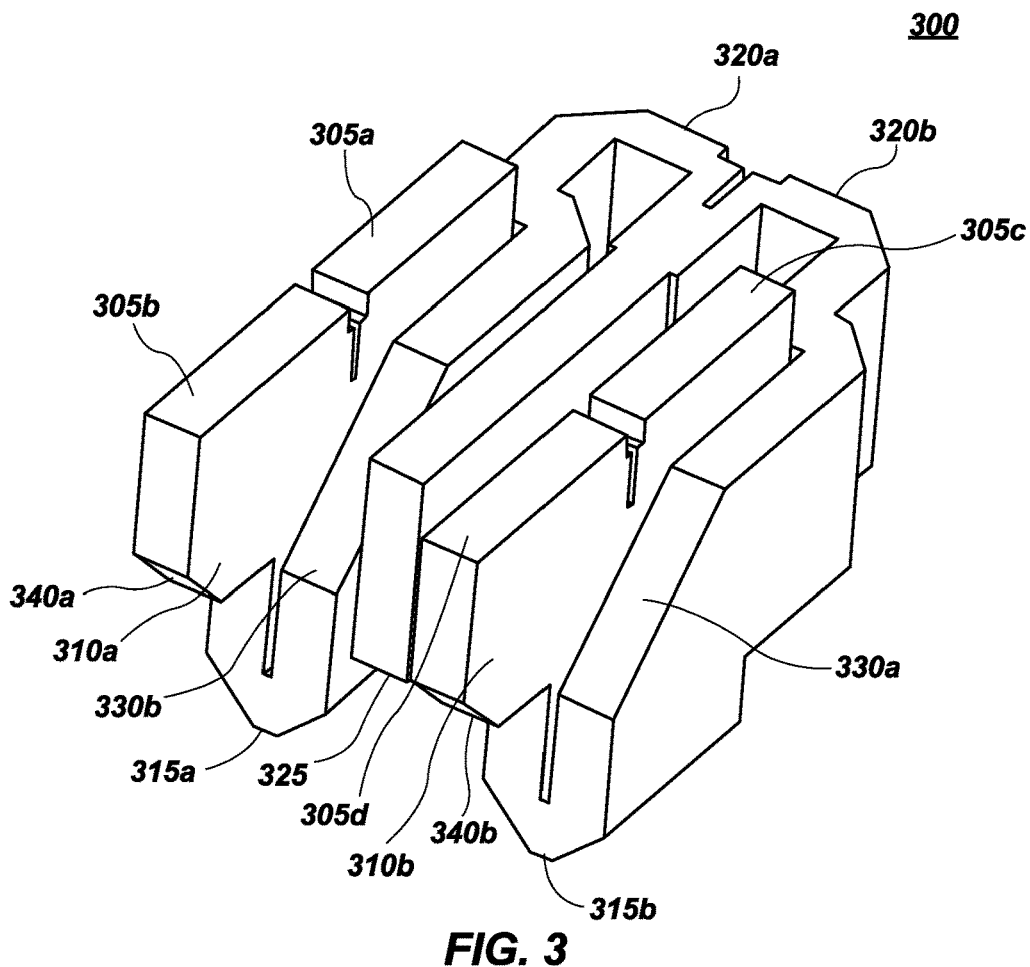
FIG. 3 illustrates a perspective view of an air volume corresponding to a 4 to 1 combiner.

FIG. 3 illustrates a perspective view of an air volume corresponding to a 4 to 1 combiner 300. Combiner 300 may be another example of an RF unit/antenna element and a library unit, as will be discussed below. As previously discussed with respect to FIG. 2, array 200, shown in FIG. 2, provides 64 radiating elements 205 to scale for gain and beamwidth purposes after scaling for operable frequency band scaling, discussed in FIG. 1. However, increasing the number of radiating elements from 1 to 64, in this example, means that 64 total outputs are created per polarization and need to be joined to produce a signal to a particular specification. Accordingly, combiner 300 may be provided in a manner that links the outputs of four of radiating elements and combines them into a single output. It may be recognized that a plurality of combiners 300 may be necessary to combine 64 outputs into a single output. A plurality of combiners may therefore be provided and electrically matched to accommodate the operable frequency band and gain specification requirements, as will be further discussed below.

With respect to combiner 300 may also be referred to as a "quad combiner," or a "corporate feed." Combiner 300 includes four "reduced height" waveguide ports 305a, 305b, 305c, and 305d. In the embodiment of combiner 300, waveguide ports 305a and 305b are combined in an H-plane "shortwall" combiner stage 310a. Likewise, ports 305c and 305d are combined in an H-plane "shortwall" combiner stage 310b. H-plane "shortwall" combiner stages 310a and 310b combine an electromagnetic wave from rectangular waveguides 305a-305d into two output rectangular waveguides that flow into U-bends 315a and 315b, respectively. U-bends 315a and 315b are similar to other U-bends disclosed herein and provide a symmetric power split from combiner stages 310a and 310b. In this manner, an electromagnetic wave received at waveguide ports 305a-305d is propagated through U-bends 315a and 315b, as shown and into an E-plane "broadwall" combiner stage 320a or 320b. The E-plane is a plane that is orthogonal to the H-plane, and is a common term of art to refer to the long axis of the waveguide. E-plane "broadwall" combiner stage 320a receives an electromagnetic wave received at waveguide ports 305a and 305b while E-plane "broadwall" combiner stage 320b receives an electromagnetic wave received at waveguide ports 305c and 305d. E-plane "broadwall" combiner stage 320a and 320b flow together into a port 325 where an electromagnetic wave may be received into or output from combiner 300, depending on whether or not a signal is being received or transmitted from an antenna array associated with combiner 300.

Thus, combiner 300 may be implemented in a single layer. Four reduced height waveguide ports 305a-305d, are combined with two H-plane "shortwall" combiner stages 310a and 310b which transition through U-bends 315a and 315b into E-Plane "broadwall" combiner stages 320a and 320b to provide a combined signal at port 325. Alternatively, if the "flow" is reversed, an electromagnetic signal provided to port 325 may be split into four equal amplitude signals at waveguide ports 305a-305d. Power split and power combining can occur simultaneously. In one embodiment, a chamfer, such as chamfer 330a may be provided between U-bend 315b and E-plane "broadwall" combiner stage 320b to provide an impedance transition to allow the electromagnetic wave to match as it propagates around corners, bends, and combiner stages. Other chamfers, such as chamfers 340a and 340b may be installed in the combiner stages 310a, and 310b, for similar reasons. Chamfer 330a will be discussed in greater detail below, with respect to FIG. 7.

Figure 4:
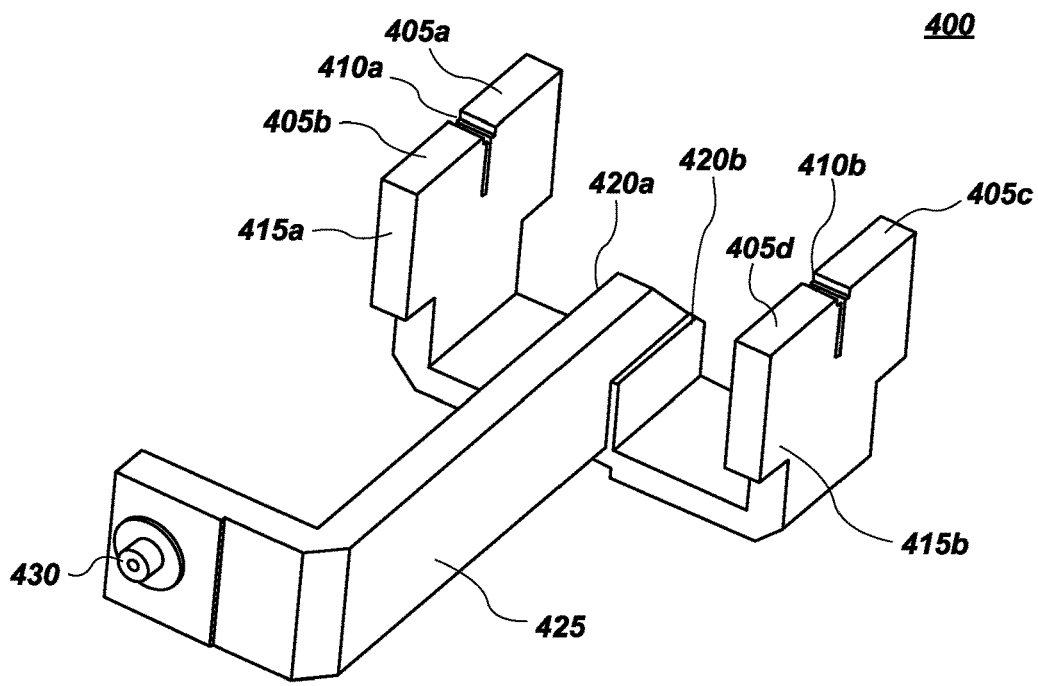
FIG. 4 illustrates a perspective view of another embodiment of an air volume corresponding to a 4 to 1 combiner.

FIG. 4 illustrates a perspective view of another embodiment of an air volume corresponding to a 4 to 1 combiner 400. As discussed with respect to FIG. 3, a plurality of 4 to 1 combiners, 300 may be implemented to accommodate 64 outputs from array 200, shown in FIG. 2 that has been scaled to a particular gain and beamwidth and a particular frequency band and bandwidth. Combiner 400 may be a secondary stage combiner which combines the outputs of four combiners 300 into a single output. For example, four combiners 300 may be combined by combiner 400 to produce a single output, resulting in a 16:1 combiner, as will be discussed below. However, any number of combiners of different types may be implemented as RF units or antenna elements or library units to accomplish a particular antenna design.

With particular respect to combiner 400, combiner 400 may also be referred to as a "quad combiner," a "connector" or a "corporate feed." Combiner 400 includes four "reduced height" waveguide ports 405a, 405b, 405c, and 405d. Waveguide ports 405a and 405b may be divided by a septum 410a which assists in combining/splitting for H-plane combiner stage 415a. Similarly, waveguide ports 405c and 405d may be divided by a septum 410b which assists in combining/splitting for H-plane combiner stage 415b. Combiner 400 further includes an E-plane combining stage 420a, associated with waveguide ports 405a and 405b which combines the electromagnetic waves received by waveguide ports 405a and 405b into a single waveguide 425. Similarly, combiner 400 includes a second E-plane combining stage 420b, associated with waveguide ports 405c and 405d which combines the electromagnetic waves received by waveguide ports 405c and 405d into a single waveguide 425. Waveguide 425 may be accessed via a connector port 430 which may be a coaxial connector, a SMA connector, a TNC connector, or any other connector disclosed herein or known to ordinarily skilled artisans.

It should be noted that, an electromagnetic wave may be provided to or received through combiner 400, in a manner similar to that described above, based on the intended "flow" of the electromagnetic wave for transmission or reception. Further, while not explicitly shown, combiner 400 may or may not be implemented with chamfers as described herein and particularly with respect to FIG. 7.

Figure 5:
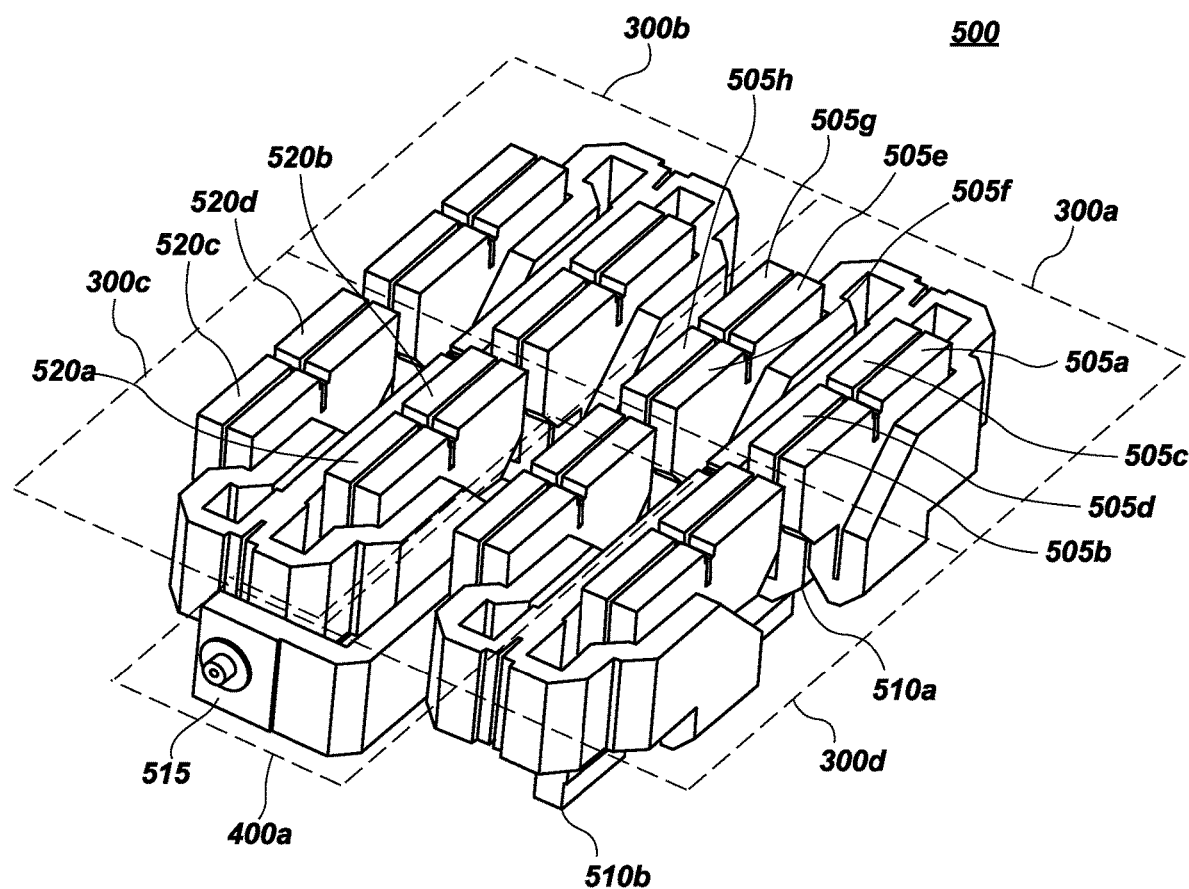
FIG. 5 illustrates a perspective view of an air volume corresponding to a 16 to 1 combiner.

FIG. 5 illustrates a perspective view of an air volume corresponding to a 16 to 1 combiner 500. As discussed with respect to FIG. 4 and FIG. 3, a plurality of 4 to 1 combiners, 400 and 300 may be implemented to accommodate 64 outputs from array 200, shown in FIG. 2 that has been scaled to a particular gain and beamwidth and a particular frequency band and bandwidth. Combiner 400 may be a secondary stage combiner which combines the outputs of four combiners 300 into a single output. For example, four combiners 300 may be combined by combiner 400 to produce a single output, resulting in a 16:1 combiner 500, as shown in FIG. 5. However, any number of combiners of different types may be implemented as RF units or antenna elements or library units to accomplish a particular antenna design. For example, four 16:1 combiners 500 may be provided to accommodate a 64 radiating element array 200, shown in FIG. 2, producing four outputs 515 (which are implemented as connectors) that may be used as is or may be again combined, using the techniques described herein into a single output 515. Combiner 500 may be an example, of another library unit that may be implemented as needed for a particular specification.

With particular respect to combiner 500, combiner 500 comprises four of 4 to 1 combiners 300, shown and described with respect to FIG. 3, assembled together, a 4 to 1 combiner 400, as shown in FIG. 4, and four 4 to 1 combiners 520a-520d, shown in FIG. 5. As shown in FIG. 5 combiner 500 is comprised of combiner 300a, 300b, 300c, and 300d which are similar in implementation and description to combiner 300 shown in FIG. 3, combiner 400 which is similar in implementation and description to combiner 400, shown in FIG. 4, and four 4 to 1 combiners 520a-520d which are illustrated in FIG. 5. Combiners 520a-520d may be another exemplary library unit, implemented as required by a particular specification. However, as shown in FIG. 5, each one of combiners 520a-520d include waveguide ports in combiner 500 to 17 support LHCP polarization in an antenna assembly. Similarly, each one of combiners 520a, 520b, 520c, and 520d, are interleaved with combiners 300a-300d and support RHCP polarization in an antenna assembly. For example, as shown in FIG. 5, combiners 300a-300d of combiner 500 may include waveguide ports 505a, 505b, 505e, and 505f which can be connected to LHCP polarization ports of a horn radiating element in an antenna assembly while combiners 520a-520d of combiner 500 may include waveguide ports 505c, 505d, 505g, and 505h can be connected to RHCP polarization ports of a horn radiating element in an antenna assembly.

In this manner a plurality of library unit combiners may be combined to meet a particular specification in an electrically matched assembly. In general, combiners, of any of the type disclosed herein 300, 400, 500, 520a-520d) may be implemented as library units. Typically, these library units may be arranged in multiples of 2 (e.g., a 4:1 combiner, an 8:1 combiner, a 16:1 combiner, etc.), although 3:1 combiners are also possible and may be implemented as library units, as will be discussed in more detail below.

Figure 6:
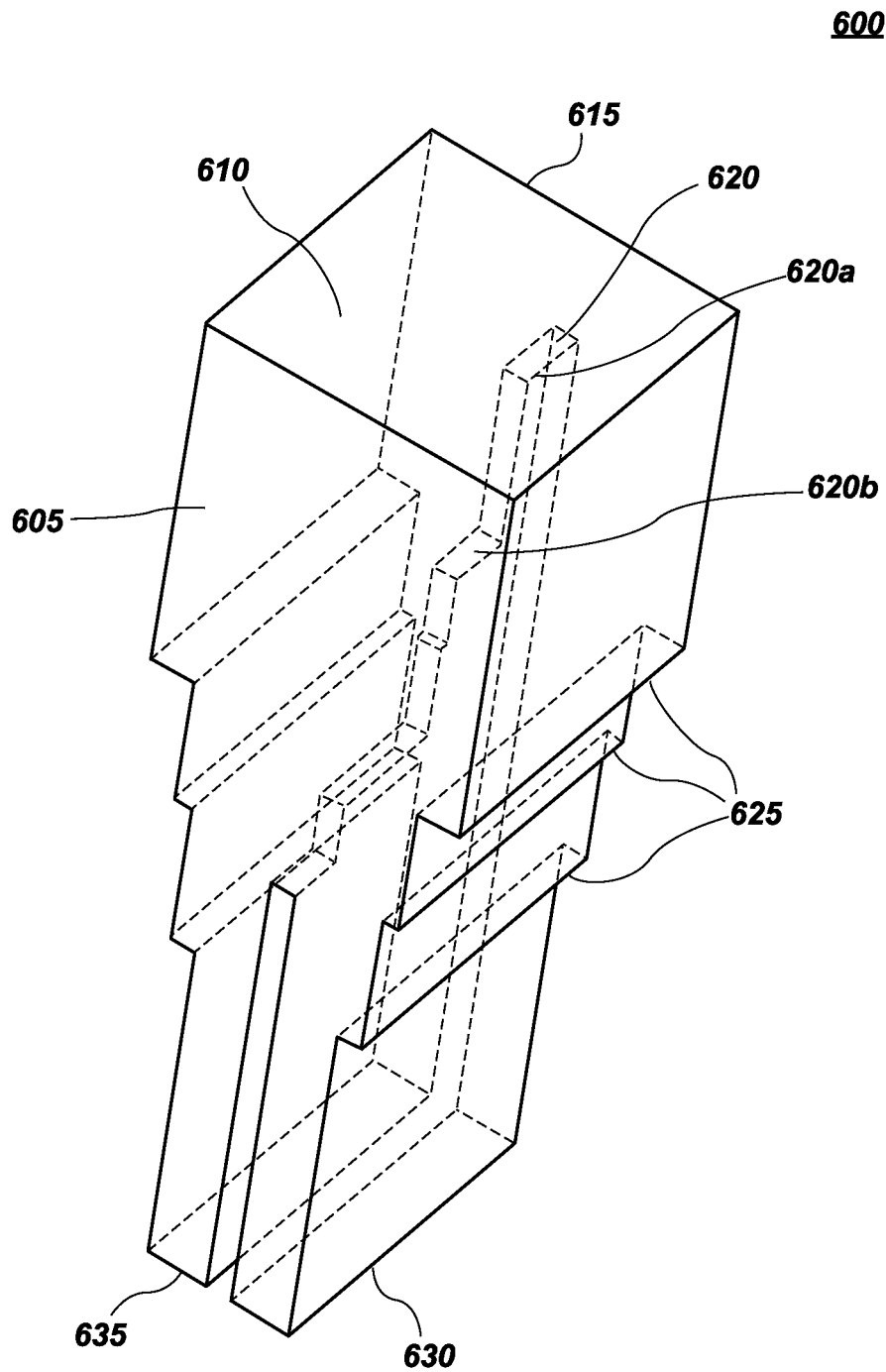
FIG. 6 illustrates a perspective view of an air volume corresponding to an embodiment of a radiating element.

FIG. 6 illustrates a perspective view of an air volume corresponding to the radiating element 600, which is similar in implementation and description to radiating element 100 shown in FIGS. 1A and 1B. Radiating element 600 may further be implemented to meet a polarization specification. For example, polarizations may be expressed as linear polarizations (horizontal and vertical) or circular (right-hand circular and left hand circular) and may be defined as the orientation of a radiated electric field. An individual radiating unit 600 is implemented with a particular polarization to meet a specification by a polarizer, such as a septum polarizer 620 shown in this example, or with an orthomode transducer ("OMT") which may be used in linear polarization specifications or a corrugated polarizer. Both an OMT and a corrugated polarizer may be implemented with a radiating element as library units.

With respect to radiating element 600, radiating element 600 includes a body 605, a void 610, a horn 615, a septum polarizer 620, and impedance steps 625. FIG. 6 further illustrates a first waveguide port 630 and a second waveguide port 635 which support an LHCP and RHCP polarization, respectively. Septum polarizer converts the TE10 waveguide into equal amplitude and 90° phase shifted TE10 and TE01 waveguide modes at horn 615. It should be noted that "equal amplitude" and 90° phase is the ideal but rarely experienced in real world applications. Thus, the term "equal amplitude" or "equal" as used herein means substantially equal or that an amplitude of the TE10 waveguide mode is within 3 dB of an amplitude of the TE01 waveguide mode. Further, 90° means substantially 90° or within a range of plus or minus 15°. Impedance steps 625 match the impedance transition from waveguide ports, such as first waveguide port 630 and second waveguide port 635. Horn 615 may be matched to space, air, a vacuum, or another dielectric for the purpose of radiating an RHCP or LHCP electromagnetic wave.

First waveguide port 630 may be implemented as a "reduced height waveguide," meaning that the short axis of waveguide port 630 is less than one half of the length of the long axis of waveguide port 630. The purpose of a reduced height waveguide is to allow for a single combining layer by spacing waveguides closely enough to have multiple waveguide runs side-by-side (as will be discussed below). A length of the long axis of waveguide port 630 determines its frequency performance of the fundamental mode (TE10, for example), while a height of waveguide port 630 may be adjusted lower or higher to either make waveguide port 630 more compact and experience a higher loss or less compact and experience a lower loss. Typical values for waveguide height when propagating the fundamental (lowest order) mode is that the short axis is less than or equal to half the length of the long axis of waveguide port 630. A signal entering first waveguide port 630 may be converted into an electromagnetic wave that rotates with left-handedness at horn 615. Second waveguide port 635 may be oppositely, but similarly, implemented to produce an electromagnetic wave that rotates with right-handedness at horn 615.

More simply, a signal entering first waveguide port 630 is converted by various steps (620a, 620b) into a circularly polarized wave at horn 615. This is accomplished by impedance matching steps 625 and the septum polarizer steps 620a, 620b, that convert a unidirectional electric field at first waveguide port 630 into a rotating LHCP wave at horn 615. Although septum polarizer steps 620a and 620b are identified, a septum polarizer 620 may be implemented with any number of steps to meet specific application requirements. Horn 615 may be opened to free space, vacuum, air, water, or any dielectric for the purpose of radiating the electromagnetic wave. Similarly, a signal entering at second waveguide port 635 may be converted into a rotating RHCP wave at horn 615.

Figure 7:
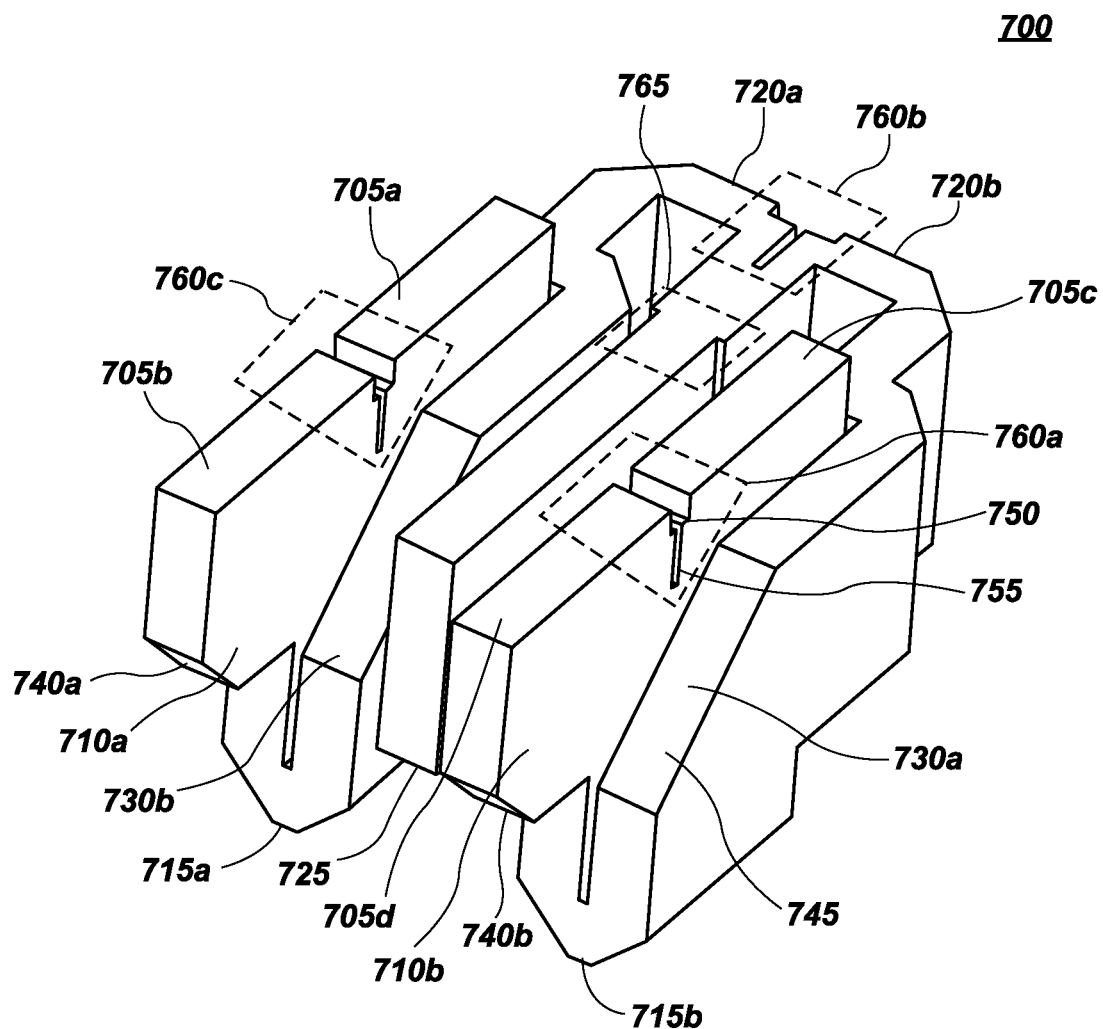
FIG. 7 illustrates a perspective view of an air volume corresponding to a 4 to 1 combiner with impedance matching elements.

FIG. 7 illustrates a perspective view of an air volume corresponding to a 4 to 1 combiner 700 with impedance matching elements, collectively referred to as elements 745-765. Combiner 700 may be another example of an RF unit/antenna element and a library unit, as will be discussed below. Combiner 700 may also be similar in implementation and description to combiner 300, shown in FIG. 3 and described above. However, combiner 700 has been "tuned" or electrically matched to meet a particular specification, as will be discussed below.

With respect to combiner 700 may also be referred to as a "quad combiner," or a "corporate feed." Combiner 700 includes four "reduced height" waveguide ports 705a, 705b, 705c, and 705d. In the embodiment of combiner 700, waveguide ports 705a and 705b are combined in an H-plane "shortwall" combiner stage 710a. Likewise, ports 705c and 705d are combined in an H-plane "shortwall" combiner stage 710b. H-plane "shortwall" combiner stages 710a and 710b combine an electromagnetic wave from rectangular waveguides 705a-705d into two output rectangular waveguides that flow into U-bends 715a and 715b, respectively. U-bends 715a and 715b are similar to other U-bends disclosed herein and provide a symmetric power split from combiner stages 710a and 710b. In this manner, an electromagnetic wave received at waveguide ports 705a-705d is propagated through U-bends 715a and 715b, as shown and into an E-plane "broadwall" combiner stage 720a or 720b. The E-plane is a plane that is orthogonal to the H-plane, and is a common term of art to refer to the long axis of the waveguide. E-plane "broadwall" combiner stage 720a receives an electromagnetic wave received at waveguide ports 705a and 705b while E-plane "broadwall" combiner stage 720b receives an electromagnetic wave received at waveguide ports 705c and 705d. E-plane "broadwall" combiner stage 720a and 720b flow together into a port 725 where an electromagnetic wave may be received into or output from combiner 700, depending on whether or not a signal is being received or transmitted from an antenna array associated with combiner 700.

Thus, combiner 700 may be implemented in a single layer. Four reduced height waveguide ports 705a-705d, are combined with two H-plane "shortwall" combiner stages 710a and 710b which transition through U-bends 715a and 715b into E-Plane "broadwall" combiner stages 720a and 720b to provide a combined signal at port 725. Alternatively, if the "flow" is reversed, an electromagnetic signal provided to port 725 may be split into four equal amplitude signals at waveguide ports 705a-705d. In one embodiment, a chamfer, such as chamfer 730a may be provided between U-bend 715b and E-plane "broadwall" combiner stage 720b to provide an impedance transition to allow the electromagnetic wave to match as it propagates around corners, bends, and combiner stages. Other chamfers, such as chamfers 740a and 740b may be installed in the combiner stages 710a, and 710b, for similar reasons. Chamfer 730a may be one example of an impedance matching element 745.

The propagation of electromagnetic waves through space, such as through the air volume of combiner 700, is subject to losses as it travels. That is to say, portions of the electromagnetic waves may be cut off, delayed, reflected, absorbed, or otherwise adversely affected by the environment surrounding the electromagnetic wave. Losses may be defined as energy that is either absorbed in the material due to ohmic loss or as reflected energy back to the input due to impedance discontinuities within an antenna assembly. Impedance matching elements may be implemented in library units in order to minimize impedance mismatch losses, to the extent possible. For example, impedance matching element 745 is implemented as a chamfer 730a which allows a signal to propagate from waveguide port 705 through U-bend 715b and so on without experiencing impedance mismatch losses in the electromagnetic wave. For example, impedance matching element 745 may be implemented so as to reflect the entirety of the electromagnetic signal received via waveguide port 705 and reflecting, or bouncing, further through combiner 700. Impedance matching element 745 is physically sized to accommodate an electromagnetic wave of a certain frequency and bandwidth without causing impedance mismatch losses to the electromagnetic wave. This condition is typically referred to as "electrically matching" or "electrically matched" but may also be referred to as an "impedance match." As various specifications are changed, every RF unit/antenna element must be adjusted or tuned to ensure that an impedance of a propagation channel of the RF unit/antenna element is consistent throughout the propagation channel to create an electrically matched antenna assembly.

As shown in FIG. 7, combiner 700 further includes impedance steps 750 and a septum 755 as part of impedance element 760a. Both impedance steps 750 and septum 755 are implemented in this position to ensure that waveguide ports 705c and 705d are electrically matched with the rest of combiner 700. Impedance element 760b may similarly ensure that waveguide ports 720a and 720b are electrically matched with the rest of combiner 700. Similarly, impedance element 760b may include impedance steps 750 and septum 755 to maintain an electrical match at a joint between E-Plane "broadwall" combiner stages 720a and 720b. Lastly, impedance element 765 may be provided as impedance steps to ensure an electrical match as the electromagnetic wave transits to port 725. Impedance elements 745-765 may be scaled or tuned according to provided specifications. Further, as will be discussed below, impedance or electrical mismatches may be identified by, for example, a computer processor, and may be automatically tuned to create an electrical or impedance match at any point in an RF unit or antenna element, including within subcomponents, as scaling is applied to an antenna assembly.

Figure 8:
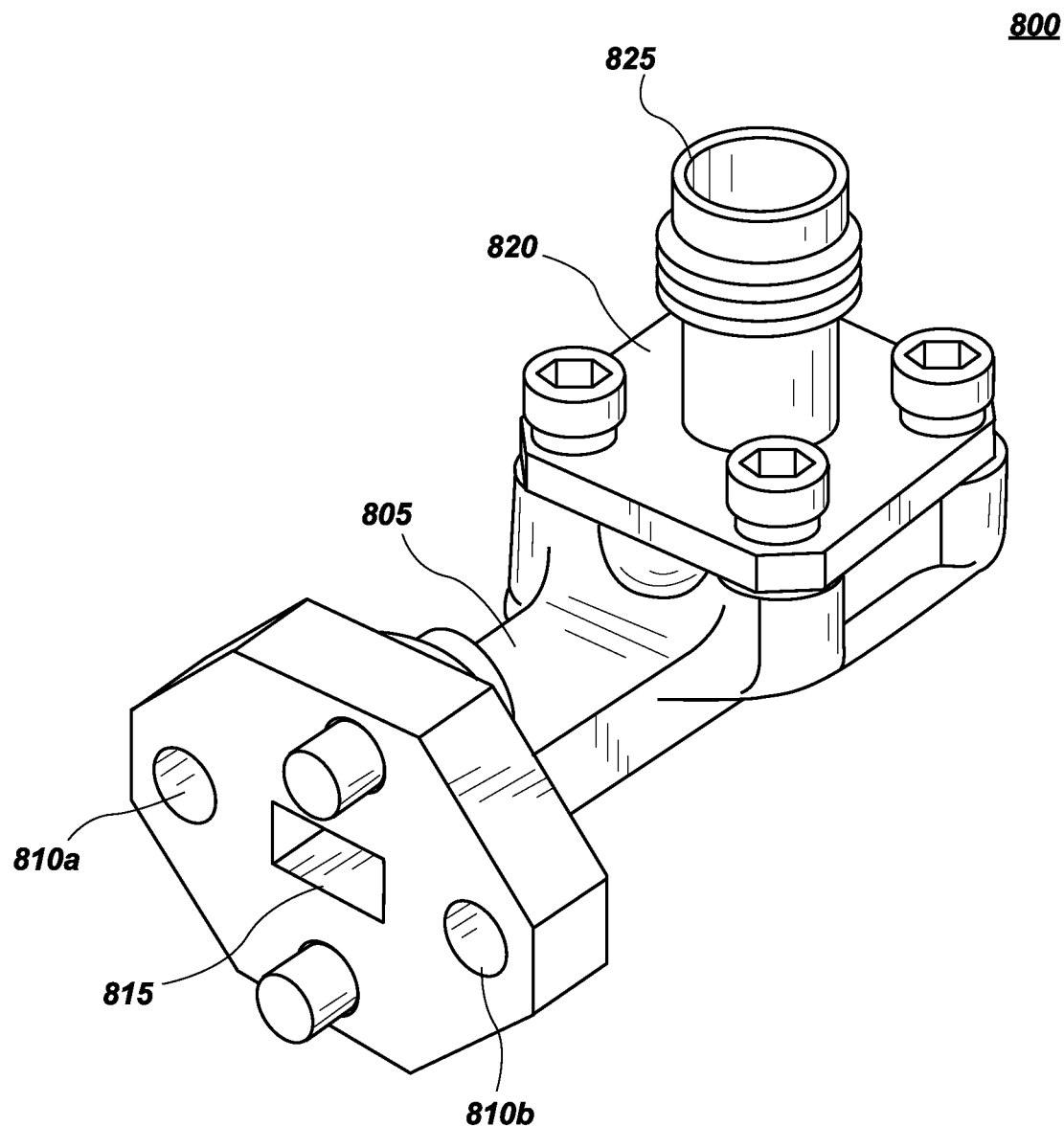
FIG. 8 illustrates a perspective view of a connector interface.

FIG. 8 illustrates a perspective view of a connector interface 800. Connector interface 800 may include a body 805 which may be made of metals and metal composites through additive manufacturing processes, using the techniques and other materials discussed above. Connector interface 800 allows a user to connect a receiver or a transmitter to an antenna assembly. As shown, connector interface 800 is shown as a single unit which may be attached through mounting holes 810a and 810b to an antenna assembly by screws, or other fasteners. However, connector interface 800 may be implemented as an integral unit with the antenna assembly as a unitary body without need for fasteners. Body 805 may provide an electromagnetic wave waveguide 815 which extends to a coaxial connector 825 and allows an electromagnetic wave or signal to be transmitted or received via an antenna assembly.

As an antenna assembly is scaled, using the techniques described above, connector interface 800 may also require scaling such that mounting holes 810a/810b may be standard or customized. Similarly, waveguide 815 (also referred to as a propagation channel) may be customized according to particular specifications. In this embodiment, a plurality of connectors 825 may be used, such as coaxial connectors, SMA connectors, 2.92 mm connectors, 2.4 mm connectors, SMP or GPO connectors, TNC connectors, and other connectors known in the art. A connector interface 820 may allow any connector 825 to be fitted to connector interface 800 to meet a particular specification.

Figure 9:
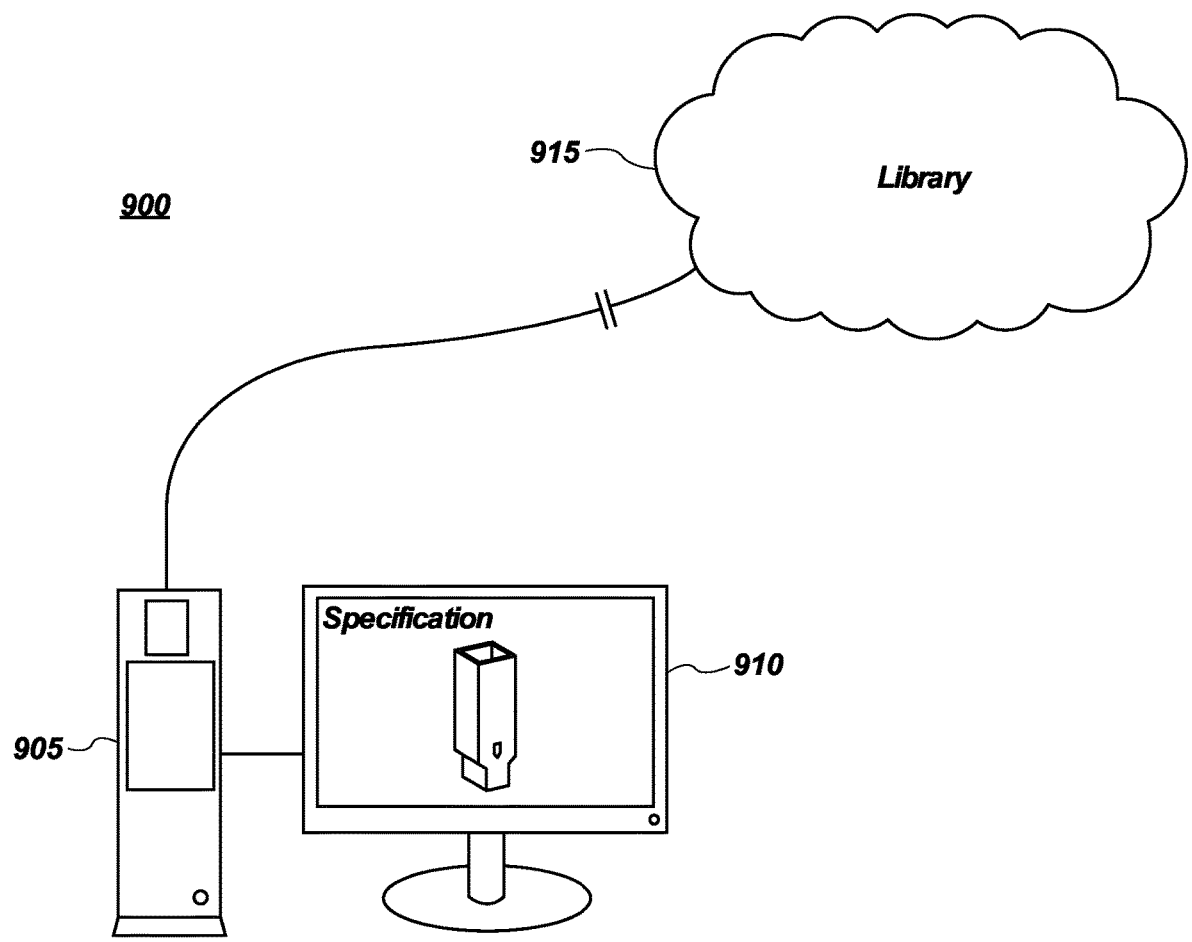
FIG. 9 illustrates a scaling system.

FIG. 9 illustrates a scaling system 900. Scaling system may include a computing device 905 which includes a processor. Scaling system 900 may further provide a display device 910, which may be implemented as a computer display, a television display, or any other display known in the art. Scaling system 900 may further include a library 915 which, in preferred embodiments, may be implemented as a database. Examples of computing device 905 include desktop computers, laptop computers, tablets, game consoles, personal computers, notebook computers, and any other electrical computing device with access to processing power sufficient to interact with library 915. Computing device 905 may include software and hardware modules, sequences of instructions, routines, data structures, display interfaces, and other types of structures that execute computer operations. Further, hardware components may include a combination of Central Processing Units ("CPUs"), buses, volatile and non-volatile memory devices, storage units, non-transitory computer-readable media, data processors, processing devices, control devices transmitters, receivers, antennas, transceivers, input devices, output devices, network interface devices, and other types of components that are apparent to those skilled in the art. These hardware components within computing device 905 may be used to execute the various spreadsheet applications, methods, or algorithms disclosed herein independent of other devices disclosed herein.

Library 915 may be implemented in computing device 905 or in cloud computers, super computers, mainframe computers, application servers, catalog servers, communications servers, computing servers, database servers, file servers, game servers, home servers, proxy servers, stand-alone servers, web servers, combinations of one or more of the foregoing examples, and any other computing device that may be used to provide access to digital information representative of RF units/antenna element library units stored therein. Library 115 may include software and hardware modules, sequences of instructions, routines, data structures, display interfaces, and other types of structures that execute server computer operations. Further, hardware components may include a combination of Central Processing Units ("CPUs"), buses, volatile and non-volatile memory devices, storage units, non-transitory computer-readable media, data processors, processing devices, control devices transmitters, receivers, antennas, transceivers, input devices, output devices, network interface devices, and other types of components that are apparent to those skilled in the art. These hardware components within library 115 may be used to execute the various methods or algorithms disclosed herein and interface with computing device 905.

Computing device 905 may connect to library 915 using any appropriate connection, wired or wireless. For example, these various internet connections may be implemented using Wi-Fi, ZigBee, Z-Wave, RF4CE, Ethernet, telephone line, cellular channels, or others that operate in accordance with protocols defined in IEEE (Institute of Electrical and Electronics Engineers) 802.11, 801.11a, 801.11b, 801.11e, 802.11g, 802.11h, 802.11i, 802.11n, 802.16, 802.16d, 802.16e, or 802.16m using any network type including a wide-area network ("WAN"), a local-area network ("LAN"), a 2G network, a 3G network, a 4G network, a Worldwide Interoperability for Microwave Access (WiMAX) network, a Long Term Evolution (LTE) network, Code-Division Multiple Access (CDMA) network, Wideband CDMA (WCDMA) network, any type of satellite or cellular network, or any other appropriate protocol.

Library 915 may store digital representations of library units, which as previously discussed, include all of the individual RF units/antenna elements necessary to create an antenna assembly. Library 915 may store these digital representations of RF units/antenna elements as sub units, combinations of subunits, or entire antenna assemblies (e.g., may store digital representations of combiner 300, shown in FIG. 3 and discussed above, combiner 500, shown in FIG. 5 and discussed above, or as an entire antenna assembly). Library 915 may include standard specifications for each library unit stored within the library in terms of frequency ranges, bandwidths, gain, beamwidth, polarization, sidelobe level, mask, return loss, use or application of connector interface, operating temperature, maximum power handling, shock resiliency, vibration resiliency, available mechanical interfaces, and maximum dimensions. Library 915 may further identify electrical characteristics of each library unit, such as waveguide impedances provided by each library unit. Further, library 915 may include physical parameter information about each library unit, which includes information about physical dimensions, in quantified units, for each library unit. Physical parameters for library units may include heights, widths, lengths, thicknesses, angles, lattice structures, and any other physical parameter that has an effect on a specification of a library unit. A non-exhaustive and exemplary list of library units, which are also RF units/antenna elements, may include a radiating element, a radiating element array, a combiner, a polarizer, an orthomode transducer, a connector interface, a filter, a diplexer, a switch, a magic tee, a circulator, a twist, a bend, a mode converter, a transmission line, a coupler, and a rotary joints. Any component, element, unit, sub-component, sub-element, or sub-unit in an RF chain of an antenna assembly may be provided as a library unit.

As shown in FIG. 9, a digital representation of library unit (e.g., a radiating element, such as radiating element 100, shown in FIG. 1A) is displayed on display device 910. A digital representation of a library may include one or more base specifications for the unit which may be characteristics for a model library unit (e.g., a library unit with a set of characteristics as base specifications for the unit, such as frequency range, bandwidth, gain, beamwidth, etc., which will be changed, as discussed below). A user may interact with computing device 905 to change the one or more base specifications to meet a new specification to, for example, redesign an antenna assembly to operate in a higher frequency range, or for any other reason. The user may provide input representative of new specifications for the library unit, including an assembly that includes a plurality of RF units/antenna elements (e.g., scaling in size or scaling in number of units). At the same time, computing device 905 may adjust physical parameters of the library unit in a manner that causes the physical parameters of the library unit to provide operation capability with the new specifications. Adjusting the physical parameters of the library unit may further include tuning the library unit with impedance elements to ensure impedance matching. Tuning may be performed manually or may be performed automatically by an antenna design engineer. Further, and optionally, the user may direct an additive manufacturing device (e.g., a three dimensional metallic printer) to fabricate the library unit with adjusted physical parameters that meet the provided specification that is different from the base specification. These techniques may reduce lead time in antenna design from years to as little as few hours.

Figure 10:
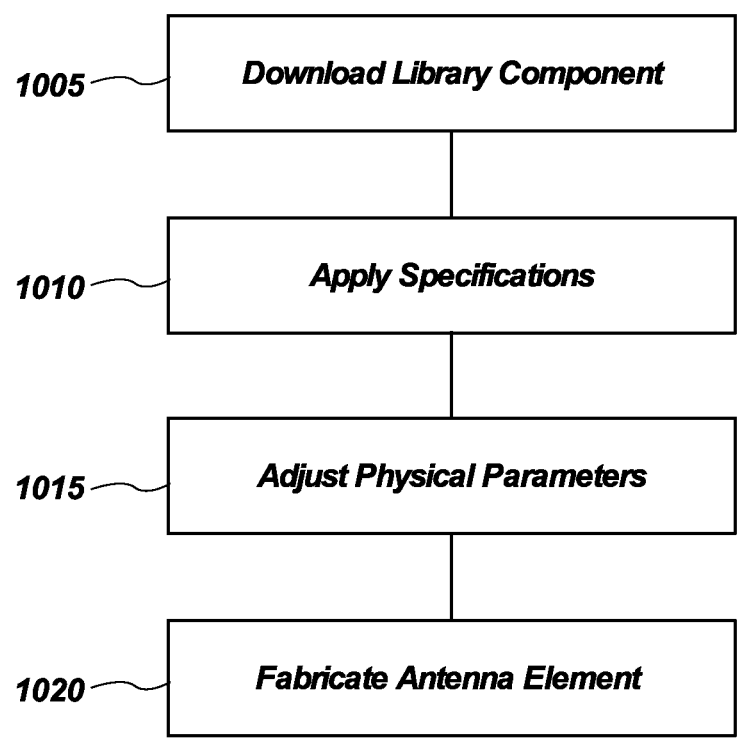
FIG. 10 illustrates a method for scaling one or more antenna elements.

FIG. 10 illustrates a method 1000 for scaling one or more antenna elements. Method 1000 may be executed by scaling system 900, shown in FIG. 9 and discussed above. Method 1000 may begin by downloading, at step 1005, by a processor in computing device 905, for example, a library component from a library 915, which may be a memory device or database. Alternatively, the processor may retrieve a library component from memory associated with computing 905 at step 1005. At step 1010, a user may provide one or more specifications for the library component, such as a gain specification, for example. Based on the provided one or more specifications, characteristics of the library unit may be changed and computing device 905 may adjust one or more physical parameters of the library component to implement the specification at step 1015. Optionally, computing device 905 may transmit the digital representation of the adjusted physical parameters of the library component to an additive manufacturing machine. Once received, the library component may be fabricated at step 1020 using additive manufacturing techniques and devices, including a three dimensional metallic printer.

The foregoing description has been presented for purposes of illustration. It is not exhaustive and does not limit the invention to the precise forms or embodiments disclosed. Modifications and adaptations will be apparent to those skilled in the art from consideration of the specification and practice of the disclosed embodiments. For example, components described herein may be removed and other components added without departing from the scope or spirit of the embodiments disclosed herein or the appended claims.

Other embodiments will be apparent to those skilled in the art from consideration of the specification and practice of the disclosure disclosed herein. It is intended that the specification and examples be considered as exemplary only, with a true scope and spirit of the invention being indicated by the following claims.

What is claimed is:

1. A method, comprising:
receiving, by a processor, digital information representative of one or more characteristics of an antenna element of an antenna assembly;
receiving, by the processor, a specification for the antenna element;
adjusting, by the processor, the digital information representative of the antenna element to adjust physical parameters of the antenna element based on the specification for the antenna element; and
fabricating the antenna element with the adjusted physical parameters.

2. The method of claim 1, wherein digital information representative of the one or more characteristics of an antenna element of an antenna assembly is stored in a computer memory.

3. The method of claim 1, wherein digital information representative of the one or more characteristics of an antenna element of an antenna assembly is stored in a database.

4. The method of claim 1, further comprising:
adjusting, by the processor, one or more physical parameters of the antenna assembly to electrically match the adjustment to the adjusted component of the antenna assembly.

5. The method of claim 1, wherein fabricating the antenna element includes an additive manufacturing process.

6. The method of claim 1, wherein the characteristics of the antenna element of the antenna assembly include one or more of a frequency, a frequency range, a bandwidth, a gain, a beamwidth, and a polarization.

7. The method of claim 1, wherein the specification for the antenna element includes one or more of a frequency, a frequency range, a bandwidth, a gain, a beamwidth, and a polarization.

8. The method of claim 1, wherein the physical parameter of the antenna element is one or more of a length, a width, a thickness, or an angle.

9. The method of claim 1, further comprising:
tuning the antenna element such that it is electrically matched to the antenna assembly.

10. A system, comprising:
a database storing digital information representative of one or more characteristics of an antenna element of an antenna assembly;
a processor:
receiving the digital information representative of the one or more characteristics of the antenna element of the antenna assembly,
receiving a specification for the antenna element of the antenna assembly,
adjusting the digital information representative of the antenna element to adjust physical parameters of the antenna element based on the specification for the antenna element; and
an additive manufacturing device fabricating the antenna element with the adjusted physical parameters.

11. The system of claim 10, wherein the additive manufacturing machine is a three dimensional printer.

12. The system of claim 11, wherein the three dimensional printer prints the antenna element using a metal or metal alloy.

13. The system of claim 10, wherein the characteristics of the antenna element of the antenna assembly include one or more of a frequency, a frequency range, a bandwidth, a gain, a beamwidth, and a polarization.

14. The system of claim 10, wherein the specification for the antenna element includes one or more of a frequency, a frequency range, a bandwidth, a gain, a beamwidth, and a polarization.

15. The system of claim 10, wherein the physical parameter of the antenna element is one or more of a length, a width, a thickness, or an angle.

16. The system of claim 10, wherein the database includes digital information for a plurality of library units.

17. The system of claim 16, wherein the library units include one or more of a radiating element, a radiating element array, a combiner, a polarizer, an orthomode transducer, and a connector interface.

18. A device, comprising,
a memory device including digital information representative of one or more characteristics of an antenna element of an antenna assembly, and
a processor:
receiving a specification for the antenna element,
adjusting the digital information representative of the antenna element to adjust physical parameters of the antenna element based on the specification for the antenna element, and
transmitting the adjusted digital information for fabrication of the antenna element.

19. The device of claim 18, wherein the characteristics of the antenna element of the antenna assembly include one or more of a frequency, a frequency range, a bandwidth, a gain, a beamwidth, and a polarization.

20. The device of claim 18, wherein the specification for the antenna element includes one or more of a frequency, a frequency range, a bandwidth, a gain, a beamwidth, and a polarization.

21. The device of claim 18, wherein the physical parameter of the antenna element is one or more of a length, a width, a thickness, or an angle.

* * * * *